United States Patent [19]

Jacobsen et al.

[11] Patent Number: 4,632,753
[45] Date of Patent: Dec. 30, 1986

[54] STRAINER BASKET PROVIDED WITH AT LEAST ONE TUBULAR SIGHTING NET OPEN AT EITHER ENDS

[75] Inventors: Finn V. Jacobsen, Vejle; Peter Jensen, Bjert, both of Denmark

[73] Assignee: Schmidt & Jessen A/SD, Denmark

[21] Appl. No.: 797,677

[22] PCT Filed: Feb. 27, 1985

[86] PCT No.: PCT/DK85/00020
§ 371 Date: Oct. 28, 1985
§ 102(e) Date: Oct. 28, 1985

[87] PCT Pub. No.: WO85/03884
PCT Pub. Date: Sep. 12, 1985

[30] Foreign Application Priority Data

Feb. 29, 1984 [DK] Denmark .............................. 1423/84

[51] Int. Cl.⁴ ............................................. B01D 45/14
[52] U.S. Cl. .................................. 210/232; 210/360.1; 210/403

[58] Field of Search ............... 210/402, 403, 483, 499, 210/232, 234, 360.1, 360.2, 369, 370, 372–377, 380.1, 378, 379

[56] References Cited

FOREIGN PATENT DOCUMENTS 816852 10/1951 Fed. Rep. of Germany .
2113110 8/1983 United Kingdom .

Primary Examiner—Frank Sever
Attorney, Agent, or Firm—Bacon & Thomas

[57] ABSTRACT

Strainer basket for liquid baskets with at least one tubular sighting net open at either ends and stretched between two retaining rings (1, 4) each connected with its respective end of the sighting net, either end of the sighting net being fastened between a retaining ring and a clamping ring (2) surrounding said retaining ring. With a view to obtain a simplified mounting and demounting of sighting nets and a simplified and improved cleaning of the strainer basket the clamping ring (2) is a firm ring which can be displaced across the retaining ring (1, 4) and arrested in this position by a rotary movement by which the clamping ring (2) engages a stationary stop (11) on or at the retaining ring (1, 4).

5 Claims, 3 Drawing Figures

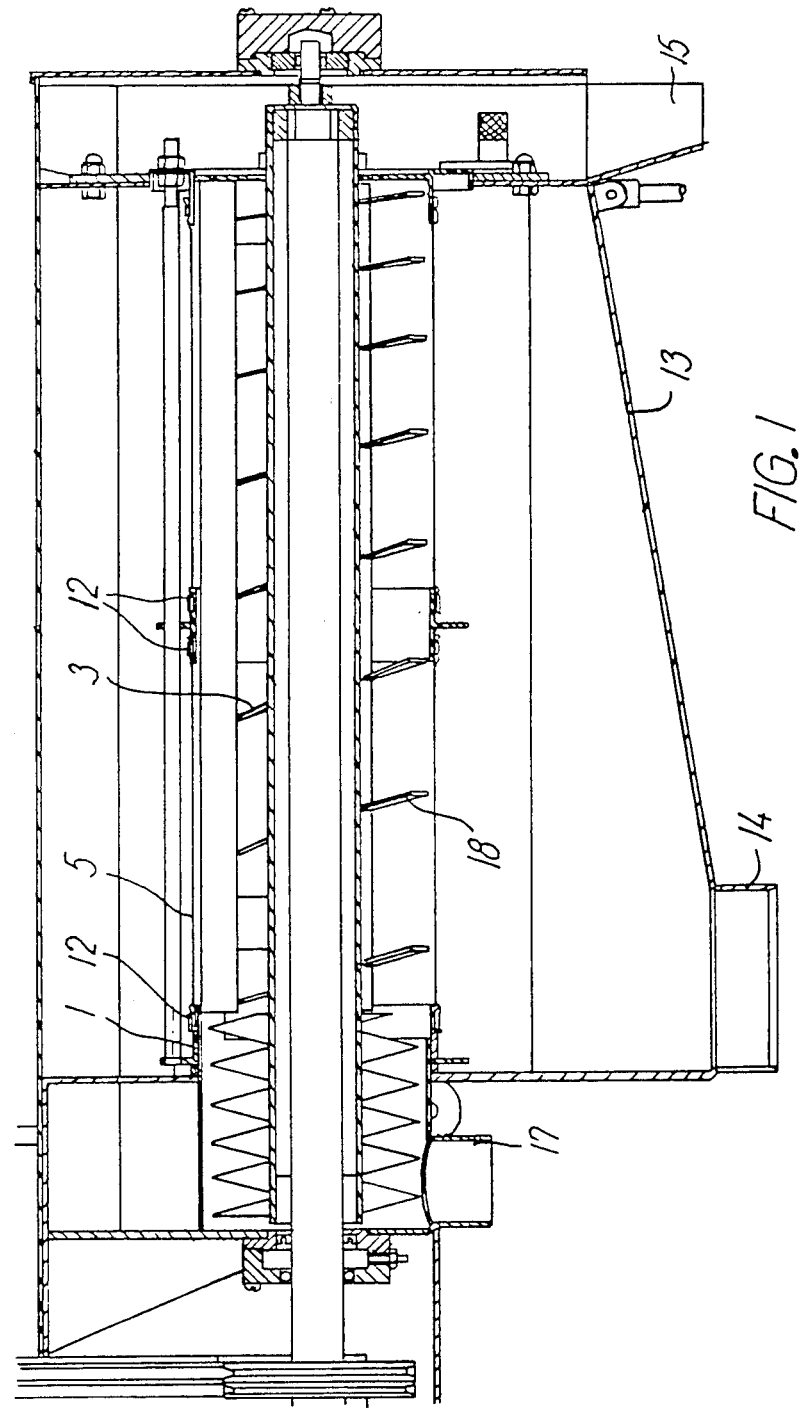

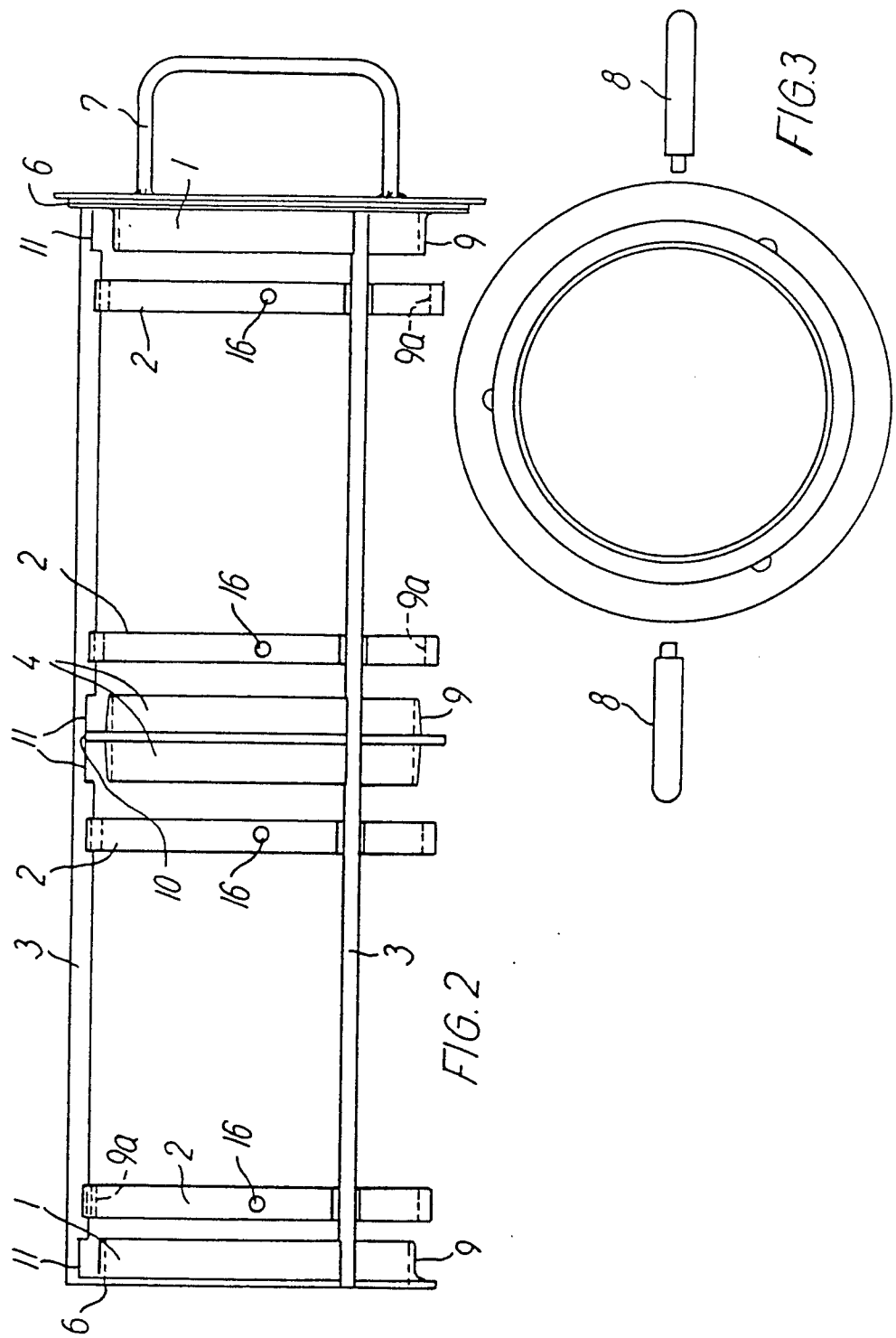

STRAINER BASKET PROVIDED WITH AT LEAST ONE TUBULAR SIGHTING NET OPEN AT EITHER ENDS

This invention relates to a strainer basket for strainers with at least one tubular sighting net open at either ends and being retained between two retaining rings connected each with its respective end of the sighting net, either end of the sighting net being secured between a retaining ring and a clamping ring surrounding said retaining ring.

Strainer baskets of said kind are for example used in strainers for clarification of liquids or concentration of liquid containing materials, e.g. within the dairy industry for clarification of milk products by straining off lumps of fat or for concentration of cheese particles by filtering off whey. They can as well be used for the filtering of waste water.

A strainer of the kind concerned is used in such a manner that the sift material, for instance milk or butter milk, is applied to the strainer basket at its one end and is axially passed through the strainer basket in set with its being made to rotate therein by means of a number of blades mounted on a pivotal shaft extending axially in the strainer basket so that the sift material is being hurled against the sighting net which detains solid particles, e.g. lumps of fat, while the liquid portion passes through the strainer meshes. The particles thus retained in the strainer basket may be transported to the other end of the strainer basket and discharged therefrom by means of a helicoid conveyor surrounding the above mentioned pivotal shaft.

It is known to secure the sighting net in such a strainer basket by means of clamping rings in the form of retaining strips which are tightened by hook or screw/nut-connections and which firmly secure the ends of the sighting net to the retaining rings, grooves cooperating with the retaining strips to securely clamp the sighting nets being provided on the outer circumference of said retaining rings.

Said fastening of the sighting net implies that effective cleaning of the strainer basket is made difficult. In particular, strainer baskets for dairy use must be cleaned quite frequently and enormously heavy demands on the cleaning are made. It is very difficult to fulfil these demands on strainer baskets with the above mentioned retaining means for the sighting nets, in particular due to the grooves in the retaining rings and the clamping members, i.e. hook locks and screw and thread elements on the retaining strips which are to be cleaned quite thoroughly. It is also a drawback that the mounting and demounting of sighting nets in case of retaining strips with screws require the use of tools.

It is a purpose of the present invention to provide a strainer basket, in which sighting nets can be mounted and demounted particularly easily and which, moreover, is particularly easy to clean effectively.

To this end a strainer basket of the kind mentioned by way of introduction is according to the invention characterized in that the clamping ring is a firm ring which by a guiding means may be moved axially across the retaining ring and being in this position pivotal in relation to the guiding means for abutment against at least one axial stop thereon.

Retaining strips and screw/thread-connections are completely avoided, and the same applies to grooves on the retaining rings, which may be completely smooth and thus extremely easy to clean. Sighting nets may further be mounted and demounted without the use of tools because the clamping ring shall only be slightly pivoted to engage and disengage, resp., the stop, which does not either require any kind of special knowledge.

In the following the invention is explained in detail by way of example on the basis of an embodiment with reference to the drawings, in which FIG. 1 illustrates a known strainer basket inserted in a liquid strainer, FIG. 2 is a strainer basket according to the invention, seen from the side, and FIG. 3 is the strainer basket illustrated in FIG. 2, from the left in FIG. 2.

In FIG. 1 which illustrates a strainer basket with two sections a tubular sighting net is designated 5 and as shown it is fastened between two retaining rings 1 by means of retaining strips 12. Sift material is applied to the strainer basket through an inlet 17 at its one end, to the left in FIG. 1. The sift material, e.g. milk, is passed therefrom into the strainer basket itself by means of an axial conveyor which may be a helicoid conveyor, conveying blades 18 mounted on a rotating shaft 3 being provided in said basket. The conveying blades 18 make the sift material rotate in the strainer basket and at the same time they effect an axial conveyance through the strainer basket, from the left to the right in FIG. 1.

The liquid portion of the sift material, e.g. milk, is hurled through the sighting net or nets 5 and is collected in a tray 13, from which the sifted material may be discharged through an outlet 14. The remaining material, e.g. lumps of fat, is passed for instance by means of a helicoid conveyor mounted around the shaft 3 with conveyor blades 18, axially to the right in FIG. 1 and on to an overflow 15.

In a strainer basket according to the invention illustrated in FIG. 2 in which the basket is likewise divided into two sections, the retaining rings 1 and 4 of which the middle ones 4 in the illustrated two-section embodiment can as well be designated intermediate rings, are provided with outer clamping surfaces 9 which may perform a clamping connection with corresponding internal clamping surfaces 9a in the clamping rings 2. Said clamping surfaces 9 and 9a may advantageously be conical as shown.

The retaining rings 1 and 4 are secured to end rings 6 and a central ring 10 which are interconnected by means of stays 3, of which the illustrated example shows three spaced apart over 120° along the circumference of the strainer basket and connected with the rings 6 and 10 by welding.

The clamping rings 2 are axially displaceable on the stays 3 on which they are guided through corresponding grooves at their circumference. Radially opposite the retaining rings 1 and 4 the stays 3 have recesses 11 in which the clamping rings 2 can freely rotate.

When a tubular sighting net not shown in the figure shall be mounted in the strainer basket its ends which may individually be provided with a bead are disposed about the retaining rings 1 and 4, following which the clamping rings 2, for instance from the position shown in FIG. 2, are displaced across the retaining rings and thus they securely fasten and tighten the sighting nets. This process is effected particularly easily when the one or the other clamping surface or both clamping surfaces 9 and 9a are conical as mentioned in the above. When the clamping rings are in this position they occur in the area of the recesses 11, and by a slight rotation the grooves at the outer periphery of the clamping rings are out of alignment with the stays 3, the clamping rings being thereby arrested by abutment against the edge of the recesses 11 in the stays.

A pair of handles may e.g. be used to rotate the clamping rings, said handles, shown at 8, being inserted into corresponding bores 16 at the outer circumference of the clamping rings.

When the sighting net or nets is/are thus mounted in the sighting tray, this may be fitted in a strainer as schematically shown in FIG. 1 by means of handles 7.

It will be seen that a strainer basket according to the invention with the particular stretching means for sighting nets entails, on the one hand, that it is possible to obtain a secure and stable stretching of sighting nets in a particularly simple manner and without the requirement for special tools or skill and, on the other hand, makes it possible to easily replace the sighting nets and finally an effective and thorough cleaning of the strainer basket is possible when the sighting net is demounted, because retaining strips and associate grooves or recesses together with thread connections and hook locks with consequent sharp edges and hardly accessible corners are completely eliminated. The fact that the stays 3 are connected by welding and not by screw-connection with the end rings 6 and the central ring 10 contributes to simplify the cleaning and to increase its effectiveness.

We claim:

1. A strainer basket comprising at least one sighting net which can be easily mounted and demounted including:
    at least one tubular sighting net open at each end,
    at least two retaining rings located at different ends of the sighting net,
    a clamping ring associated with each retaining ring adapted to surround said retaining ring, for securing the sighting net between the retaining ring and the clamping ring when said clamping ring is positioned to surround said retaining ring, and
    guiding means for said each clamping ring for permitting the clamping ring to be movable axially across its respective retaining ring and being in this position pivotal in relation to the guiding means for abutment against at least one axial stop contained on the guiding means.

2. A strainer basket as claimed in claim 1, wherein said guiding means comprises longitudinally extending stays disposed radially opposite the retaining rings.

3. A strainer basket as claimed in claim 2, wherein each clamping ring has, in its outer periphery, grooves which are in engagement with said longitudinal extending stays.

4. A strainer basket as claimed in claim 2, wherein said longitudinally extending stays have recesses in which the clamping rings may freely rotate.

5. A strainer basket as claimed in any one of claims 1, 2, 3 or 4, wherein the outer surface of the retaining rings and/or the inner surface of the clamping rings are conical.

* * * * *